(12) United States Patent
Fu

(10) Patent No.: US 7,538,928 B1
(45) Date of Patent: May 26, 2009

(54) MEMS MIRROR WITH PARALLEL SPRINGS AND ARCHED SUPPORT FOR BEAMS

(75) Inventor: Yee-Chung Fu, Fremont, CA (US)

(73) Assignee: Advanced NuMicro Systems, Inc., San Jose, CA (US)

( * ) Notice: Subject to any disclaimer, the term of this patent is extended or adjusted under 35 U.S.C. 154(b) by 23 days.

(21) Appl. No.: 11/695,595

(22) Filed: Apr. 2, 2007

Related U.S. Application Data (63) Continuation-in-part of application No. 11/263,795, filed on Oct. 31, 2005, now Pat. No. 7,301,689.

(51) Int. Cl.
*G02B 26/08* (2006.01)
*G02B 26/00* (2006.01)

(52) U.S. Cl. ...................... 359/225; 359/290

(58) Field of Classification Search ................ 359/198, 359/214, 221, 225, 290, 295, 298, 318
See application file for complete search history.

(56) References Cited

U.S. PATENT DOCUMENTS 6,735,004 B1   5/2004   Hagelin et al.
7,095,156 B2   8/2006   Yoda et al.
2006/0222312 A1*   10/2006   Mala et al. .................. 385/147

FOREIGN PATENT DOCUMENTS

JP   2005-181394   7/2005

\* cited by examiner

*Primary Examiner*—William C Choi
(74) *Attorney, Agent, or Firm*—Patent Law Group LLP; David C. Hsia (57) ABSTRACT

A micro-electro-mechanical system (MEMS) mirror device includes (1) a mirror, (2) spring elements coupled to the mirror, (3) a beam coupled to the group of spring elements, (4) a spring coupled to the beam, and (5) a stationary pad coupled to the spring. The spring elements includes (1) a straight section having a first end coupled to the beam structure, and (2) spring sections having (a) first ends coupled to a second end of the straight section and (b) second ends coupled to the mirror.

14 Claims, 8 Drawing Sheets

MEMS MIRROR WITH PARALLEL SPRINGS AND ARCHED SUPPORT FOR BEAMS

CROSS REFERENCE TO RELATED APPLICATIONS

This application is a continuation-in-part of U.S. application Ser. No. 11/263,795, entitled "MEMS Mirror with Parallel Springs and Arched Support for Beams," filed on Oct. 31, 2005, which is incorporated herein by reference. This application is related to U.S. Pat. No. 6,985,279, and U.S. patent application Ser. No. 11/201,672, filed on Aug. 10, 2005, which are commonly assigned and incorporated herein by reference.

FIELD OF INVENTION

This invention relates to micro-electro-mechanical system (MEMS) devices, and more particularly to MEMS scanning mirrors.

DESCRIPTION OF RELATED ART

Figure 1:
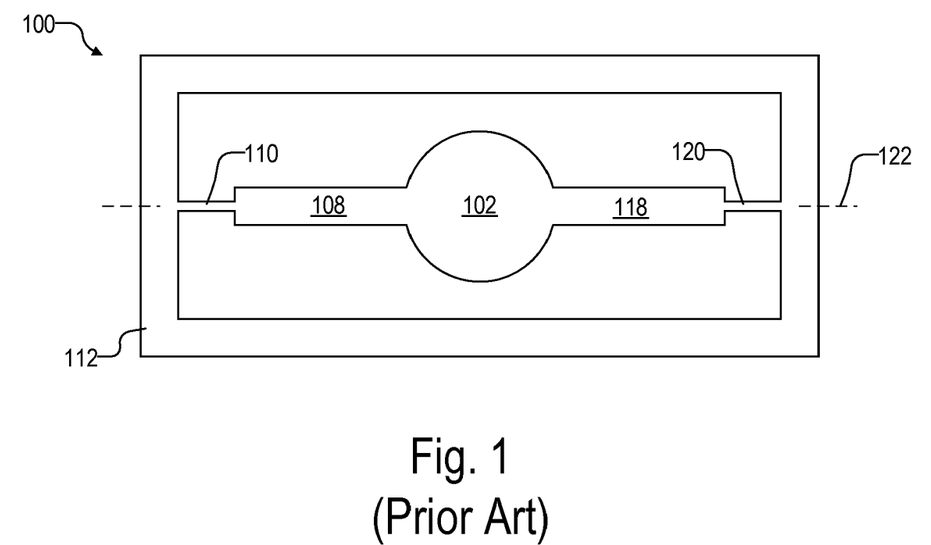
FIGS. 1 and 2 illustrate a conventional MEMS mirror device.

FIG. 1 illustrates a conventional MEMS mirror device 100. Device 100 includes a mirror 102 having a first half connected rigidly to a rigid beam 108. Beam 108 is then coupled by a torsion spring 110 to a stationary pad 112. Mirror 102 has a second half connected rigidly to a rigid beam 118. Beam 118 is then coupled by a torsion spring 120 to stationary pad 112. Although not shown, rotational comb teeth may extend from beams 108 and 118 to be interdigitated with stationary comb teeth. The rotational and stationary comb teeth form an actuator that rotates mirror 102 along a rotational axis 122.

Figure 2:
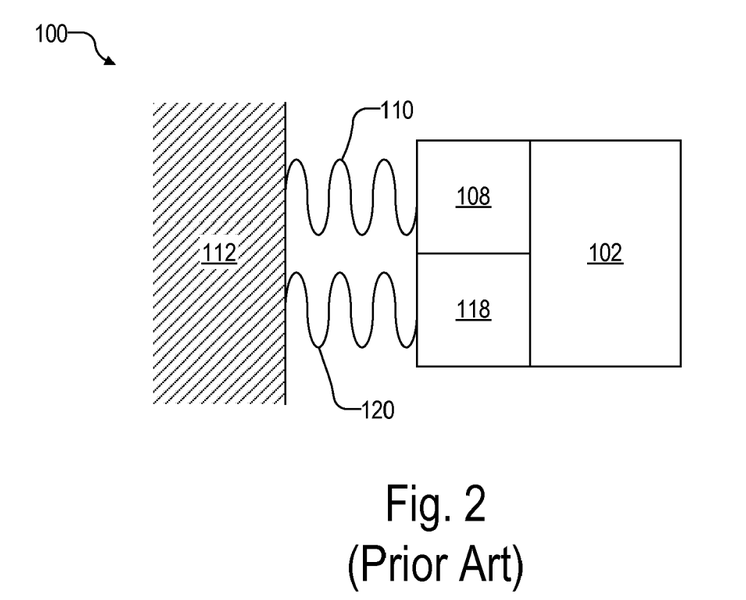

FIG. 2 illustrates a model of device 100 that illustrates the rotation of mirror 102 as linear oscillation. As they are rigidly connected, mirror 102 and beams 108 and 118 can be modeled as a single mass having one degree of freedom. In other words, beams 108 and 118 oscillate mirror 102 in unison. Referring back to FIG. 1, the rotation angle of mirror 102 is limited to the rotation angle of beams 108 and 118 even though a different (e.g., preferably greater) angle may be desired. Thus, what is needed is a MEMS mirror device that allows the mirror to rotate at a different angle than the actuator.

SUMMARY

In one embodiment of the invention, a micro-electro-mechanical system (MEMS) mirror device includes (1) a mirror, (2) spring elements coupled to the mirror, (3) a beam coupled to the group of spring elements, (4) a spring coupled to the beam, and (5) a stationary pad coupled to the spring. The spring elements includes (1) a straight section having a first end coupled to the beam structure, and (2) spring sections having (a) first ends coupled to a second end of the straight section and (b) second ends coupled to the mirror.

BRIEF DESCRIPTION OF THE DRAWINGS

Use of the same reference numbers in different figures indicates similar or identical elements.

DETAILED DESCRIPTION OF THE INVENTION

Hereafter a spring is differentiated from a rigid beam by the amount of stress they experience during rotation. During rotation, the spring stores most of the potential/strain energy and the rigid beam experiences very low stress compared to the spring.

Figure 3:
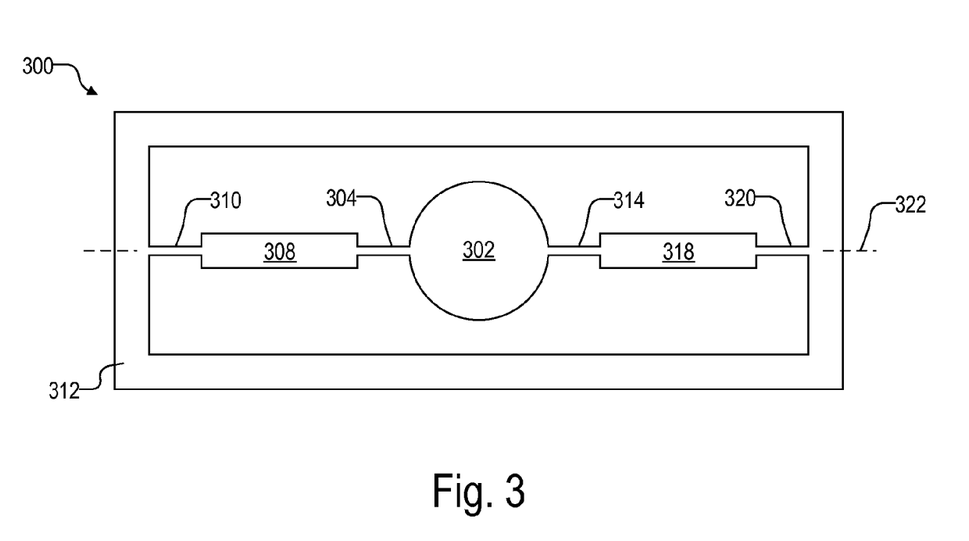
FIGS. 3 and 4 illustrate a MEMS mirror device in a prior commonly assigned U.S. patent application.

FIG. 3 illustrates a micro-electro-mechanical system (MEMS) mirror device 300 as disclosed in U.S. patent application Ser. Nos. 10/910,384 and 11/201,672. Device 300 includes a mirror 302 having a first half coupled by a torsion spring 304 to a rigid beam 308. Beam 308 is then coupled by a torsion spring 310 to a stationary pad 312. Mirror 302 has a second half coupled by a torsion spring 314 to a rigid beam 318. Beam 318 is then coupled by a torsion spring 320 to stationary pad 312. Although not shown, rotational comb teeth may extend from beams 308 and 318 to be interdigitated with stationary comb teeth. The rotational and stationary comb teeth form an actuator that rotates mirror 302 along a rotational axis 322.

Figure 4:
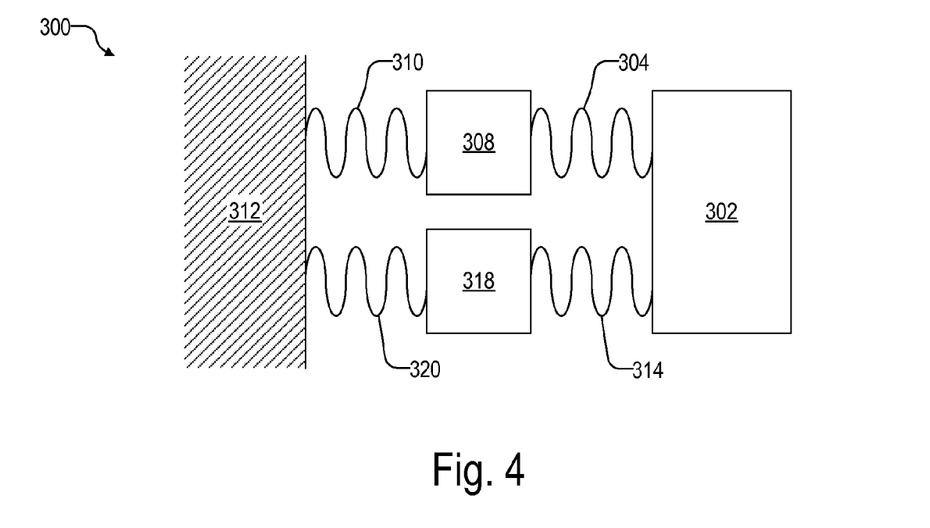

FIG. 4 illustrates a model of device 300 that illustrates the rotation of mirror 302 as linear oscillation. The oscillations of beams 308 and 318 are transferred to mirror 302 by springs 304 and 314. Springs 304 and 314 are intended to amplify the oscillations of beams 308 and 318 so that mirror 302 oscillates at a greater magnitude than beams 308 and 318. However, as beams 308 and 318 are coupled by springs at both ends, they have multiple degrees of freedom and may not oscillate in unison. When beams 308 and 318 do not oscillate in unison, they may work against each other and make it difficult to control the oscillating of mirror 302. Furthermore, they may also generate unwanted mirror vibration in addition to the mirror rotation about axis 322.

Figure 5:
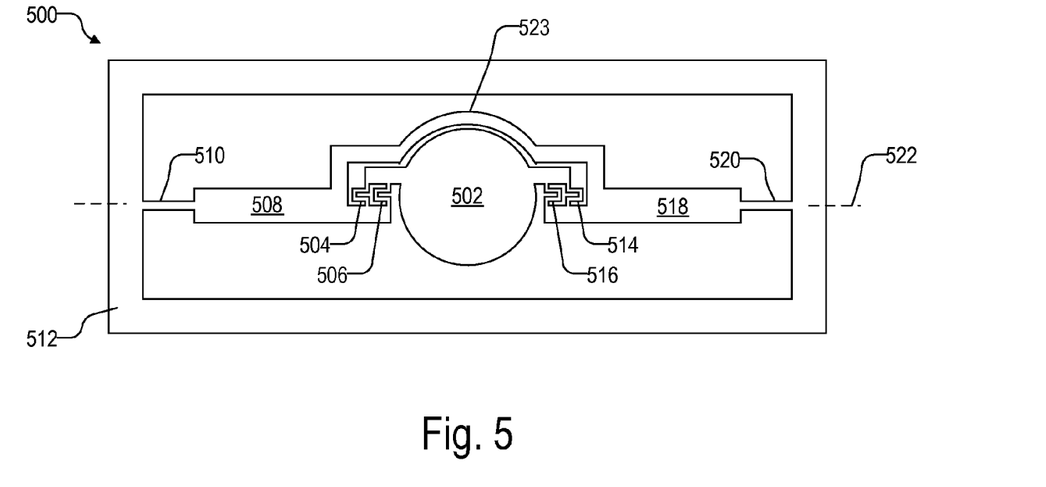
FIGS. 5 and 6 illustrate a MEMS mirror device in one embodiment of the invention.

FIG. 5 illustrates a MEMS mirror device 500 in one embodiment of the invention. Device 500 includes a mirror 502 having a first half coupled in parallel by torsion springs 504 and 506 to a rigid beam 508. Beam 508 is then coupled by a torsion spring 510 to a stationary pad 512. Mirror 502 has a second half coupled in parallel by torsion springs 514 and 516 to a rigid beam 518. Beam 518 is then coupled by a torsion spring 520 to stationary pad 512. Beams 508 and 518 are interconnected rigidly by a support beam 523 so beams 508 and 518 rotate in unison. In one embodiment, support beam 523 is an arch extending from beams 508 and 518 around mirror 502. Springs 504, 506, 510, 514, 516, and 520 are formed so their rotational axes align along a rotational axis 522 of mirror 502. Although not shown, rotational comb teeth may extend from beams 508 and 518 to be interdigitated with stationary comb teeth. The rotational and stationary comb teeth form an actuator that rotates mirror 502 along axis 522.

Figure 6:
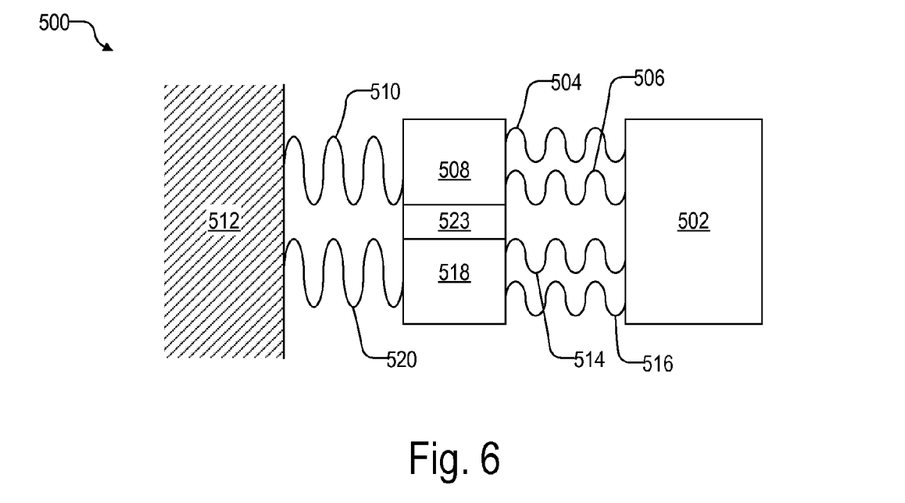

FIG. 6 illustrates a model of device 500 that illustrates the rotation of mirror 502 as linear oscillation. As beams 508 and 518 are connected rigidly by support beam structure 523, they have a single degree of freedom and oscillate in unison. As beams 508 and 518 oscillate in unison, the oscillation of mirror 502 is easy to control. The oscillation of beams 508 and 518 is transferred to mirror 502 by springs 504, 506, 514, and 516. Springs 504, 506, 514, and 516 in turn amplify the oscillation of beams 508 and 518 so that mirror 502 oscillates at a greater magnitude than beams 508 and 518. As multiple springs couple beams 508 and 518 to mirror 502, each of the springs can be made of lower spring constant to prolong the life of the springs.

Figure 7:
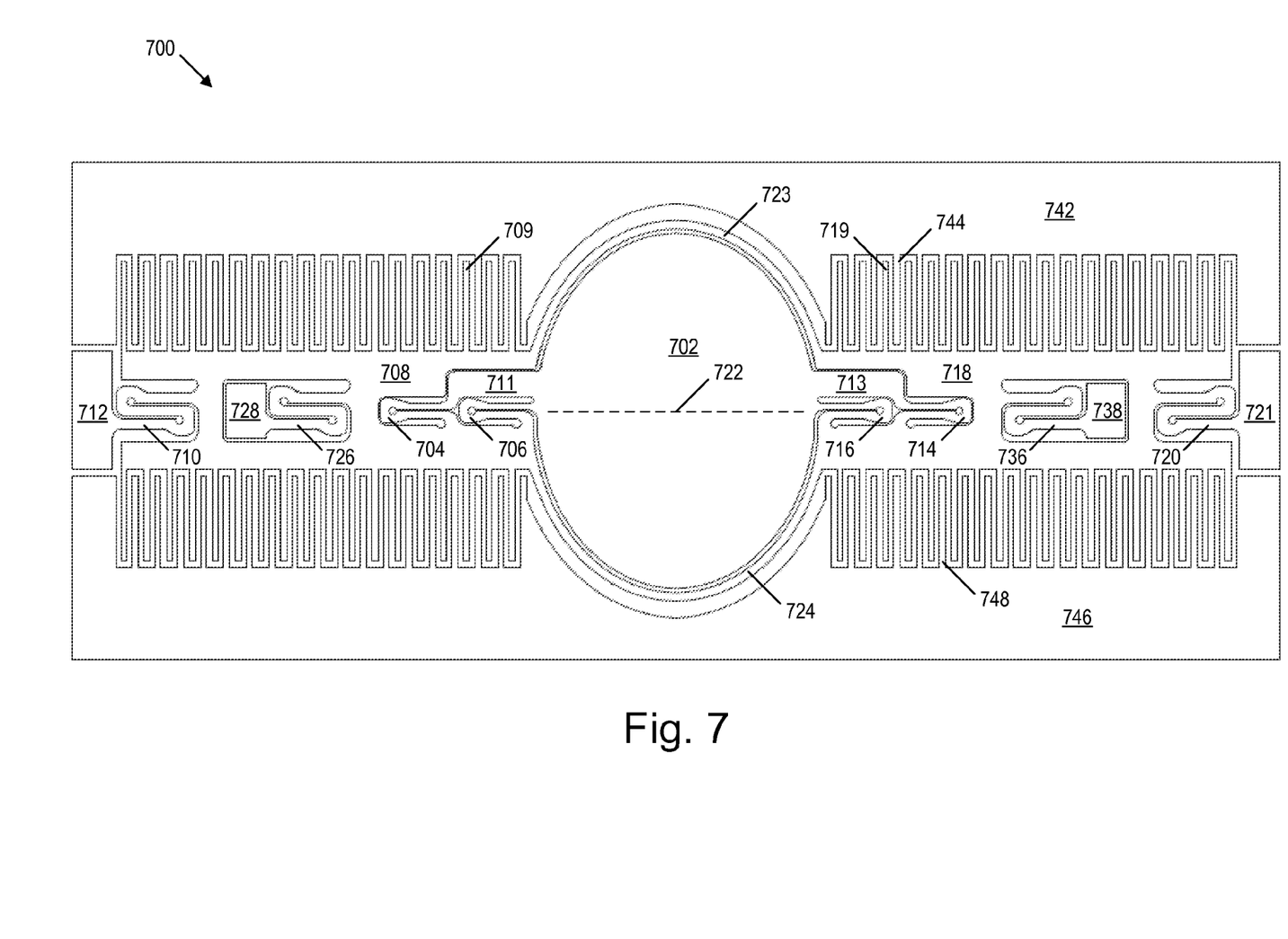
FIG. 7 illustrates a MEMS mirror device in another embodiment of the invention.

FIG. 7 illustrates a MEMS mirror device 700 in one embodiment of the invention. Device 700 includes a mirror 702 having a first half coupled in parallel by torsion springs 704 and 706 to a proximal end of a rigid beam structure 708. In one embodiment, springs 704 and 706 are U-shaped springs. In other embodiments, springs 704 and 706 may be straight or serpentine-shaped springs. The first end of spring 704 is connected to a rigid tab 711 extending from mirror 702 while the first end of spring 706 is connected directly to mirror 702. The second ends of springs 704 and 706 are connected directly to beam structure 708.

A distal end of beam structure 708 is then coupled by a torsion spring 710 to a stationary pad 712. Beam structure 708 is further coupled by a torsion spring 726 to a stationary pad 728, where both spring 726 and stationary pad 728 are located in an opening in beam structure 708.

In one embodiment, springs 710 and 726 are serpentine springs. In other embodiments, springs 710 and 726 may be straight springs.

Mirror 702 has a second half coupled in parallel by torsion springs 714 and 716 to a proximal end of a rigid beam structure 718. In one embodiment, springs 714 and 716 are U-shaped springs. In other embodiments, springs 714 and 716 may be straight or serpentine-shaped springs. The first end of spring 714 is connected to a rigid tab 713 extending from mirror 702 while the first end of spring 716 is connected directly to mirror 702. The second ends of springs 714 and 716 are connected directly to beam structure 718.

A distal end of beam structure 718 is then coupled by a torsion spring 720 to stationary pad 712. Beam structure 718 is further coupled by a torsion spring 736 to a stationary pad 738, where both spring 736 and stationary pad 738 are located in an opening in beam structure 718.

In one embodiment, springs 720 and 736 are serpentine springs. In other embodiments, springs 720 and 736 may be straight springs.

Beams 708 and 718 are interconnected rigidly by support beams 723 and 724 so beams 708 and 718 rotate in unison. In one embodiment, support beam 723 is an arch extending from a first side of beams 708 and 718 (e.g., above a rotational axis 722 of mirror 702) around mirror 702, and supporting beam 724 is an arch extending from a second side of beams 708 and 718 around mirror 702 (e.g., below rotational axis 722).

Springs 704, 706, 710, 726, 714, 716, 720, and 736 are formed so their rotational axes are aligned along rotational axis 722 of mirror 702. Rotational comb teeth 709 extend from beams structure 708 while rotational comb teeth 719 extend from beam structure 718. Rotational comb teeth 709 and 719 are interdigitated with stationary comb teeth 744 extending from stationary pad 742 facing the first side of beams 708 and 718. Rotational comb teeth 709 and 719 are further interdigitated with stationary comb teeth 748 extending from stationary pad 746 facing the second side of beams 708 and 718. The rotational and the stationary comb teeth form an actuator that rotates mirror 702 along axis 722. Note that the stationary comb teeth may be in the same plane as the rotational comb teeth or the stationary comb teeth may be vertically offset from the rotational comb teeth.

Although each mirror half is shown to be connected by two springs to a beam structure, additional springs can be added to connect the mirror half to the beam structure. Although each beam structure is shown to be connected by two springs to two stationary pads, additional springs can be added to connect the beam structure to additional stationary pads.

Figure 8A:
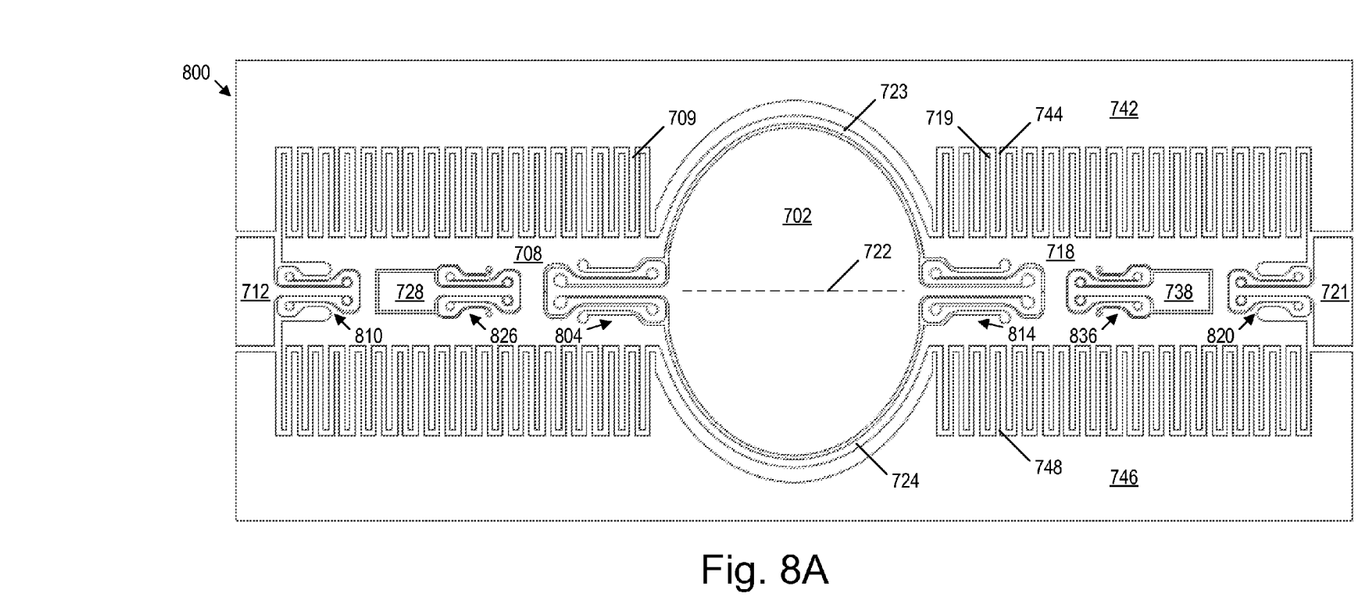
FIGS. 8A and 8B illustrate the MEMS mirror device of FIG. 7 with a different spring design in one embodiment of the invention.

FIG. 8A illustrates a MEMS mirror device 800 in one embodiment of the invention. Device 800 is similar to device 700 (FIG. 7) except for its springs. Mirror 702 is coupled by springs 804 and 814 to rigid beam structures 708 and 718, respectively. Beam structure 708 is coupled by springs 810 and 826 to stationary pads 712 and 728, respectively. Similarly, beam structure 718 is coupled by springs 820 and 836 to stationary pads 721 and 738, respectively. Springs 804, 810, 826, 814, 820, and 836 are formed so their rotational axes are aligned along rotational axis 722 of mirror 702.

Figure 8B:
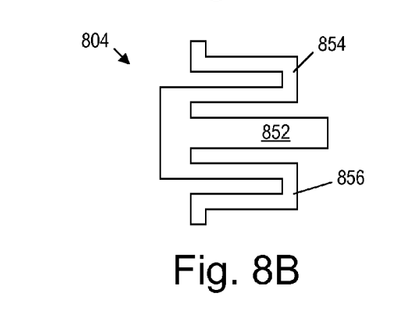

FIG. 8B illustrates a simplified view of spring 804 in one embodiment of the invention. Spring 804 includes multiple spring elements. Specifically, spring 804 includes a straight section 852 having a first end connected to mirror 702 and a second end connected to first ends of two parallel U-shaped sections 854 and 856 on opposing sides of section 852. Second ends of sections 854 and 856 are in turn connected to beam structure 708. In other embodiments, U-shaped sections 854 and 856 are replaced by straight or serpentine-shaped spring sections. Sections 854 and 856 are made thinner than section 852 to match the stresses they experience under rotation. As can be seen, sections 852 and 854 together make a serpentine-shaped spring. Similarly, sections 852 and 856 together make a serpentine-shaped spring. Thus, spring 804 is similar to two parallel serpentine springs.

Spring 814 is made in the same shape and size as spring 804. In one embodiment, springs 810, 826, 820, and 836 are made of the same shape as spring 804 but their sizes may be different. Furthermore, as shown in FIG. 8A, the first ends of their straight sections 852 are connected to stationary pads instead of a mirror.

Figure 9A:
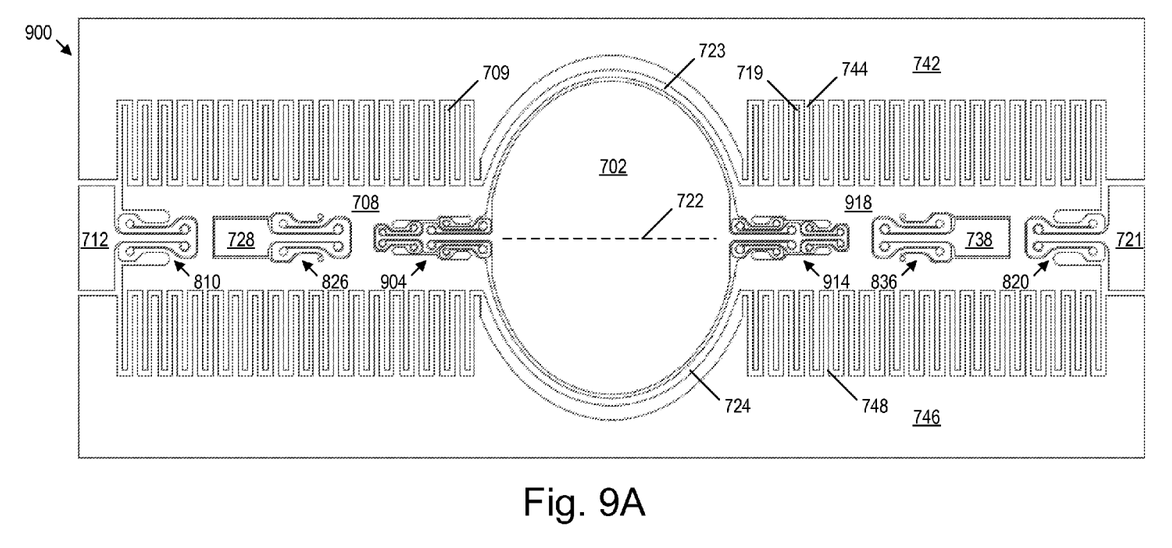
FIGS. 9A and 9B illustrate the MEMS mirror device of FIG. 8A with a different spring design in one embodiment of the invention.

FIG. 9A illustrates a MEMS mirror device 900 in one embodiment of the invention. Device 900 is similar to device 800 except springs 804 and 814 have been replaced by springs 904 and 914, respectively. Springs 904 and 914 are similar to springs 804 and 814 except each has additional U-sections on opposing sides of its additional straight section. Springs 904, 810, 826, 914, 820, and 836 are formed so their rotational axes are aligned along rotational axis 722 of mirror 702.

Figure 9B:
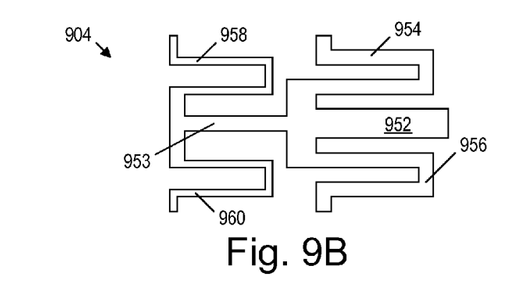

FIG. 9B illustrates a simplified view of spring 904 in one embodiment of the invention. Spring 904 includes multiple spring elements. Specifically, spring 904 includes a straight section 952 having a first end connected to mirror 702 and a second end connected to a first end of a second straight section 953. Section 953 is made thinner than section 952 to match the stresses they experience under rotation.

The second end of sections 952 is further connected to first ends of two parallel U-shaped sections 954 and 956 on opposing sides of section 952. In other embodiments, U-shaped sections 954 and 956 may be replaced by straight or serpentine-shaped spring sections as described later. Second ends of sections 954 and 956 are in turn connected to beam structure 708. Sections 954 and 956 are made thinner than section 952 to match the stresses they experience under rotation. As can be seen, sections 952 and 954 together make a serpentine-shaped spring. Similarly, sections 952 and 956 together make a serpentine-shaped spring. Thus, this part of spring 904 is similar to two parallel serpentine springs.

A second end of section 953 is connected to first ends of two parallel U-shaped sections 958 and 960 on opposing sides of section 953. In other embodiments, U-shaped sections 958 and 960 may be replaced by straight or serpentine-shaped spring sections as described later. Second ends of sections 958 and 960 are in turn connected to beam structure 708. Sections 958 and 960 are made thinner than section 953 to match the stresses they experience under rotation. As can be seen, sections 953 and 958 together make a serpentine-shaped spring. Similarly, sections 953 and 960 together make a serpentine-shaped spring. Thus, this part of spring 904 is similar to two parallel serpentine springs, and together spring 904 has four parallel serpentine springs.

Spring 914 is made in the same shape and size as spring 904. Although springs 904 and 914 are shown with two pairs of U-shaped sections, additional pairs of U-shaped sections can be added.

Figure 9C:
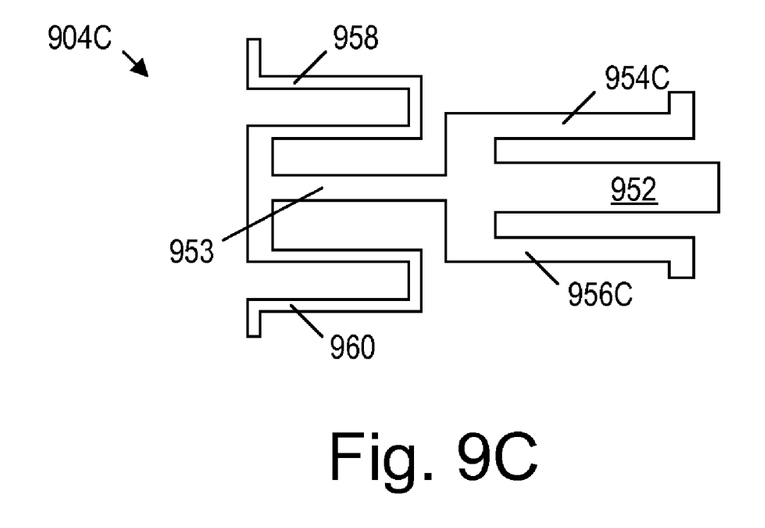
FIGS. 9C and 9D illustrate different spring designs in embodiments of the invention.

FIG. 9C illustrates a simplified view of a spring 904C that can replace spring 904 in one embodiment of the invention. Spring 904C is similar to spring 904 except that U-shaped sections 954 and 956 have been replaced by straight sections 954C and 956C that are connected to the second end of straight section 952. As can be seen, sections 952 and 954C together make a U-shaped spring. Similarly, sections 952 and 956C together make a U-shaped spring. Thus, this part of spring 904C is similar to two parallel U-shaped springs.

Figure 9D:
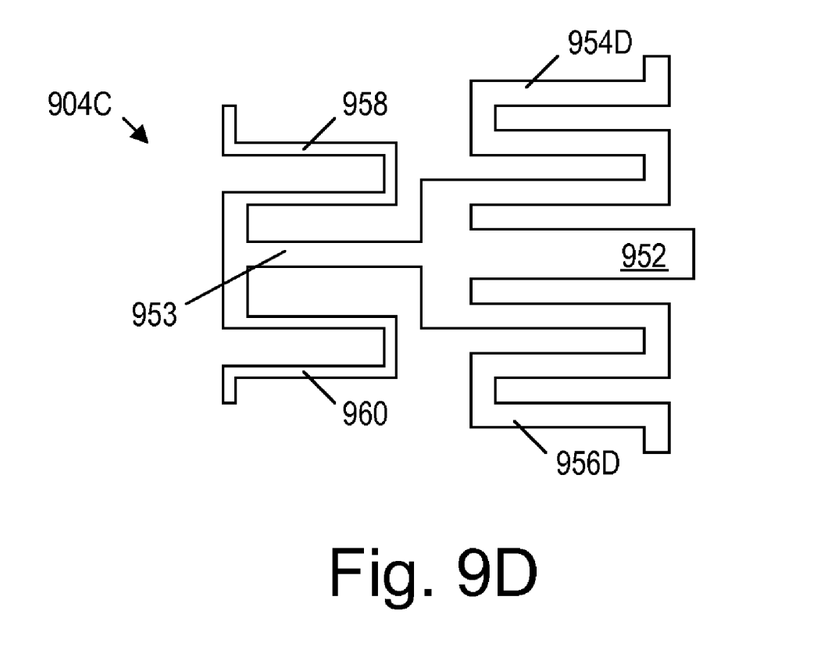

FIG. 9D illustrates a simplified view of a spring 904D that can replace spring 904 in one embodiment of the invention. Spring 904D is similar to spring 904 except that U-shaped sections 954 and 956 have been replaced by serpentine sections 954D and 956D that are connected to the second end of straight section 952. As can be seen, sections 952 and 954D together make a longer serpentine spring. Similarly, sections 952 and 956D together make a longer serpentine spring.

Figure 10:
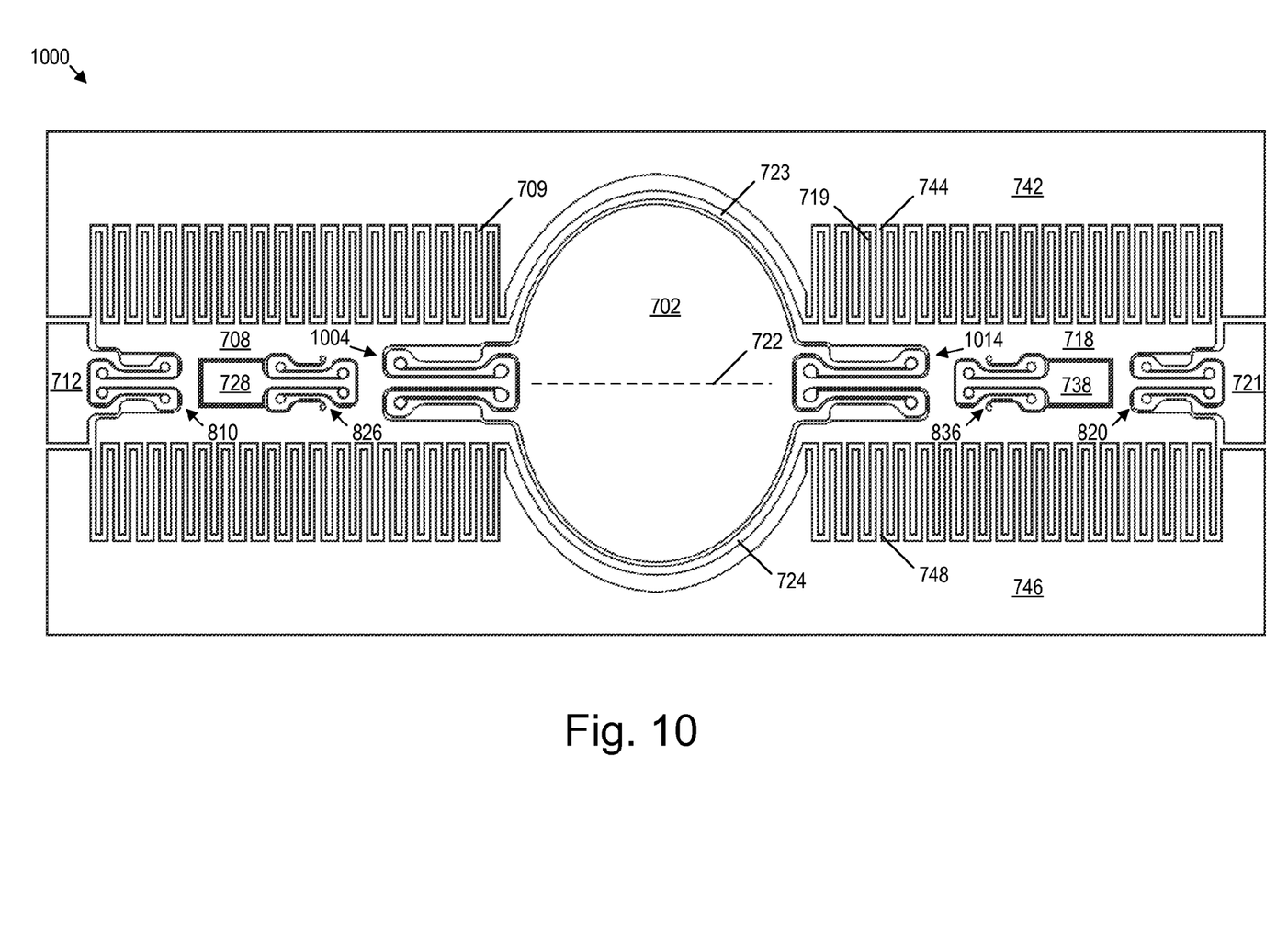
FIG. 10 illustrates the mirror device of FIG. 8A with a different spring design in one embodiment of the invention.

FIG. 10 illustrates a MEMS mirror device 1000 in one embodiment of the invention. Device 1000 is similar to device 800 (FIG. 8A) except springs 804 and 814 have been replaced by springs 1004 and 1014, respectively. Springs 1004 and 1014 have the same shape as springs 804 (FIG. 8B) but the ends of sections 854 and 856 are now connected to mirror 702 and the end of straight section 852 is now connected to beam 708. Springs 1004, 810, 826, 1014, 820, and 836 are formed so their rotational axes are aligned along rotational axis 722 of mirror 702.

In the various devices described above, the natural frequency of the device can be adjusted by applying a steady voltage difference between the rotational and stationary comb teeth. For example, the voltages applied to the rotational and stationary comb teeth may be steady voltages, including ground.

In the various devices described above, the mirror can be rotated by applying an oscillating voltage difference between the rotational and the stationary comb teeth. For example, a first voltage applied to the rotational comb teeth may be an oscillating voltage while a second voltage applied to the stationary comb teeth may be a steady voltage, or vice versa. The steady voltage may be ground or have an offset used to adjust the natural frequency of the device.

Various other adaptations and combinations of features of the embodiments disclosed are within the scope of the invention. Numerous embodiments are encompassed by the following claims.

What is claimed is:

1. A micro-electro-mechanical system (MEMS) mirror device, comprising:
    a mirror;
    a plurality of spring elements coupled to one half of the mirror;
    a beam structure having (1) a proximal end coupled by the plurality of spring elements to said one half of the mirror and (2) a distal end extending away from said one half of the mirror;
    a spring coupled to the beam structure;
    a stationary pad coupled by the spring to the beam structure;
    wherein the plurality of spring elements and the spring have rotational axes aligned to a rotational axis of the mirror;
    wherein the plurality of spring elements comprises:
        a straight section, wherein a first end of the straight section is coupled to the beam structure; and
        a plurality of spring sections, wherein first ends of the spring sections are coupled to a second end of the straight section, and second ends of the spring sections are coupled to said one half of the mirror.

2. The MEMS mirror device of claim 1, further comprising:
    another plurality of spring elements coupled to another half of the mirror;
    another beam structure having (1) a proximal end coupled by said another plurality of spring elements to said another half of the mirror and (2) a distal end extending away from said another half of the mirror;
    another spring coupled to said another beam structure;
    another stationary pad coupled by said another spring to said another beam structure;
    a support beam structure rigidly coupled to the beam structure and said another beam structure so they rotate the mirror in unison; and
    wherein said another plurality of spring elements and said another spring have rotational axes aligned to the rotational axis of the mirror.

3. The MEMS mirror device of claim 2, wherein the support beam structure comprises an arch extending from the beam structure and said another beam structure around the mirror.

4. The MEMS mirror device of claim 2, further comprising:
    another support beam structure rigidly coupled to the beam structure and said another beam structure.

5. The MEMS mirror device of claim 1, wherein the spring and the stationary pad are located within the beam structure.

6. The MEMS mirror device of claim 1, further comprising:
    a plurality of rotational teeth extending from the beam structure;
    another stationary pad; and
    a plurality of stationary teeth extending from said another stationary pad, wherein the stationary teeth are interdigitated with the rotational teeth.

7. The MEMS mirror device of claim 1, wherein the spring comprises:
    a straight section, wherein a first end of the straight section is coupled to the stationary pad; and
    a plurality of spring sections, wherein first ends of the spring sections are coupled to a second end of the straight section, and second ends of the spring sections are coupled to the beam structure.

8. The MEMS mirror device of claim 7, wherein the spring sections of the spring elements and the spring are selected from the group consisting of straight-shaped springs, U-shaped springs, and serpentine-shaped springs.

9. A method for operating a micro-electro-mechanical system (MEMS) mirror device, comprising:

coupling one half of a mirror to a plurality of spring elements;

coupling a beam structure by the plurality of spring elements to said one half of the mirror, the beam structure having (1) a proximal end coupled to the plurality of spring elements and (2) a distal end extending away from said one half of the mirror;

coupling the beam structure to a spring, wherein the plurality of spring elements and the spring have rotational axes aligned to a rotational axis of the mirror;

coupling a stationary pad by the spring to the beam structure;

rotating the beam structure, wherein the plurality of spring elements transfer a rotational motion of the beam structure to the mirror so the mirror rotates at a different angle than the beam structure; and wherein the plurality of spring elements comprises:
- a straight section, wherein a first end of the straight section is coupled to the beam structure; and
- a plurality of spring sections, wherein first ends of the spring sections are coupled to a second end of the straight section, and second ends of the spring sections are coupled to said one half of the mirror.

10. The method of claim 9, wherein said rotating the beam structure comprises:
- providing a first voltage to a plurality of rotational teeth extending from the beam structure; and
- providing a second voltage to a plurality of stationary teeth, the stationary teeth being interdigitated with the rotational teeth.

11. The method of claim 9, further comprising:
- coupling another half of the mirror to another plurality of spring elements;
- coupling another beam structure by said another plurality of spring elements to said another half of the mirror;
- coupling said another beam structure to another spring, wherein said another plurality of spring elements and said another spring have rotational axes aligned with the rotational axis of the mirror;
- coupling another stationary pad by said another spring to said another beam structure; and
- rigidly coupling the beam structure and said another beam structure with a support beam structure so they rotate the mirror in unison.

12. The method of claim 11, further comprising rigidly coupling the beam structure and said another beam structure with another support beam structure.

13. The method of claim 9, wherein the spring comprises:
- a straight section, wherein a first end of the straight section is coupled to the stationary pad; and
- a plurality of spring sections, wherein first ends of the spring sections are coupled to a second end of the straight section, and second ends of the spring sections are coupled to the beam structure.

14. The method of claim 13, wherein the spring sections of the spring elements and the spring are selected from the group consisting of straight-shaped springs, U-shaped springs, and serpentine-shaped springs.

\* \* \* \* \*